United States Patent [19]

Sudo

[11] Patent Number: 5,205,618
[45] Date of Patent: Apr. 27, 1993

[54] HYDRAULIC BRAKE SYSTEM
[75] Inventor: Yukio Sudo, Kanagawa, Japan
[73] Assignee: Atsugi Unisia Corporation, Kanagawa, Japan
[21] Appl. No.: 719,414
[22] Filed: Jun. 24, 1991
[30] Foreign Application Priority Data Jun. 22, 1990 [JP] Japan .................. 2-65415[U]

[51] Int. Cl.⁵ .............................................. B60T 15/46
[52] U.S. Cl. .................................. 303/84.1; 137/493.9
[58] Field of Search ......... 303/84.1, DIG. 5, DIG. 6; 137/493.3, 497.6, 493.9

[56] References Cited

U.S. PATENT DOCUMENTS

| | | | |
|---|---|---|---|
| 4,428,396 | 1/1984 | Wall | 137/493.9 |
| 4,441,712 | 7/1990 | Hirobe | 303/DIG. 5 X |
| 4,472,873 | 11/1990 | Fulmer et al. | 303/84.1 X |
| 4,784,444 | 11/1988 | McCann et al. | 303/111 X |
| 4,790,414 | 12/1988 | Harrison | 303/84.1 X |
| 4,964,680 | 10/1990 | Nokubo et al. | 303/DIG. 5 X |
| 5,048,561 | 9/1991 | Taplin et al. | 137/493.9 |
| 5,082,345 | 9/1991 | Becker et al. | 303/DIG. 5 X |

FOREIGN PATENT DOCUMENTS 60-33158  2/1985  Japan .

Primary Examiner—Robert J. Oberleitner
Assistant Examiner—Lee W. Young
Attorney, Agent, or Firm—Bachman & LaPointe

[57] ABSTRACT

A hydraulic brake system comprises an electromagnetic normally open inflow valve fluidly disposed between a master cylinder and a wheel cylinder, and a hydraulically shiftable plunger valve fluidly disposed between the electromagnetic inflow valve and master cylinder. The plunger valve is responsive to hydraulic fluid forced out of the master cylinder for establishing a first state wherein flow of hydraulic fluid forced into the wheel cylinder is restricted or a second state wherein hydraulic fluid forced out of the master cylinder into the wheel cylinder is unrestricted.

11 Claims, 5 Drawing Sheets

HYDRAULIC BRAKE SYSTEM

BACKGROUND OF THE INVENTION

The present invention relates to a hydraulic brake system, and more particularly to a hydraulic brake system with a skid control function.

Japanese Patent Application First (unexamined) Publication No. 60-33158 discloses a hydraulic brake system with a skid control function. The known hydraulic brake system has an electromagnetic inflow valve fluidly disposed between a master cylinder and a wheel cylinder, a fixed orifice fluidly disposed between the inflow valve and the master cylinder and an electromagnetic normally open orifice bypass valve arranged in parallel to this fixed orifice. In skid control, the electromagnetic normally open orifice bypass valve is closed, and flow of hydraulic fluid forced out of the master cylinder toward the wheel cylinder is restricted by the fixed orifice. During usual braking, the electromagnetic normally open orifice bypass valve is opened and flow of hydraulic fluid forced out of the master cylinder into the wheel cylinder is unrestricted. Owing to the provision of this fixed orifice, occurrence of pressure urge during skid control is prevented.

An object of the present invention is to improve a hydraulic brake system of the above kind such that, without an electromagnetic orifice bypass valve, restriction of flow of hydraulic fluid forced to of a master cylinder toward a wheel cylinder is controlled.

SUMMARY OF THE INVENTION

According to one aspect of the invention, there is provided a hydraulic brake system comprising:
a master cylinder;
a wheel cylinder
a passageway establishing hydraulic fluid communication between said master and wheel cylinder;
means fluidly disposed in said passageway between said master cylinder and said wheel cylinder, said means being responsive to hydraulic fluid forced out of said master cylinder for establishing a first state wherein flow of hydraulic fluid forced into said wheel cylinder is restricted or a second state wherein hydraulic fluid forced out of said master cylinder through said passageway into said wheel cylinder is unrestricted.

According to another aspect of the present invention, there is provided a hydraulic brake system comprising:
a master cylinder;
a wheel cylinder
a passageway establishing hydraulic fluid communication between master and wheel cylinder;
a normally open inflow valve fluidly disposed in said passageway between said master cylinder and said wheel cylinder;
means fluidly disposed in said passageway between said master cylinder and said normally open inflow valve, said means being responsive to hydraulic fluid forced out of said master cylinder for establishing a first state wherein flow of hydraulic fluid forced into said wheel cylinder is restricted or a second state wherein hydraulic fluid forced out of said master cylinder through said passageway into said wheel cylinder is unrestricted.

DETAILED DESCRIPTION OF THE INVENTION

Figure 1:
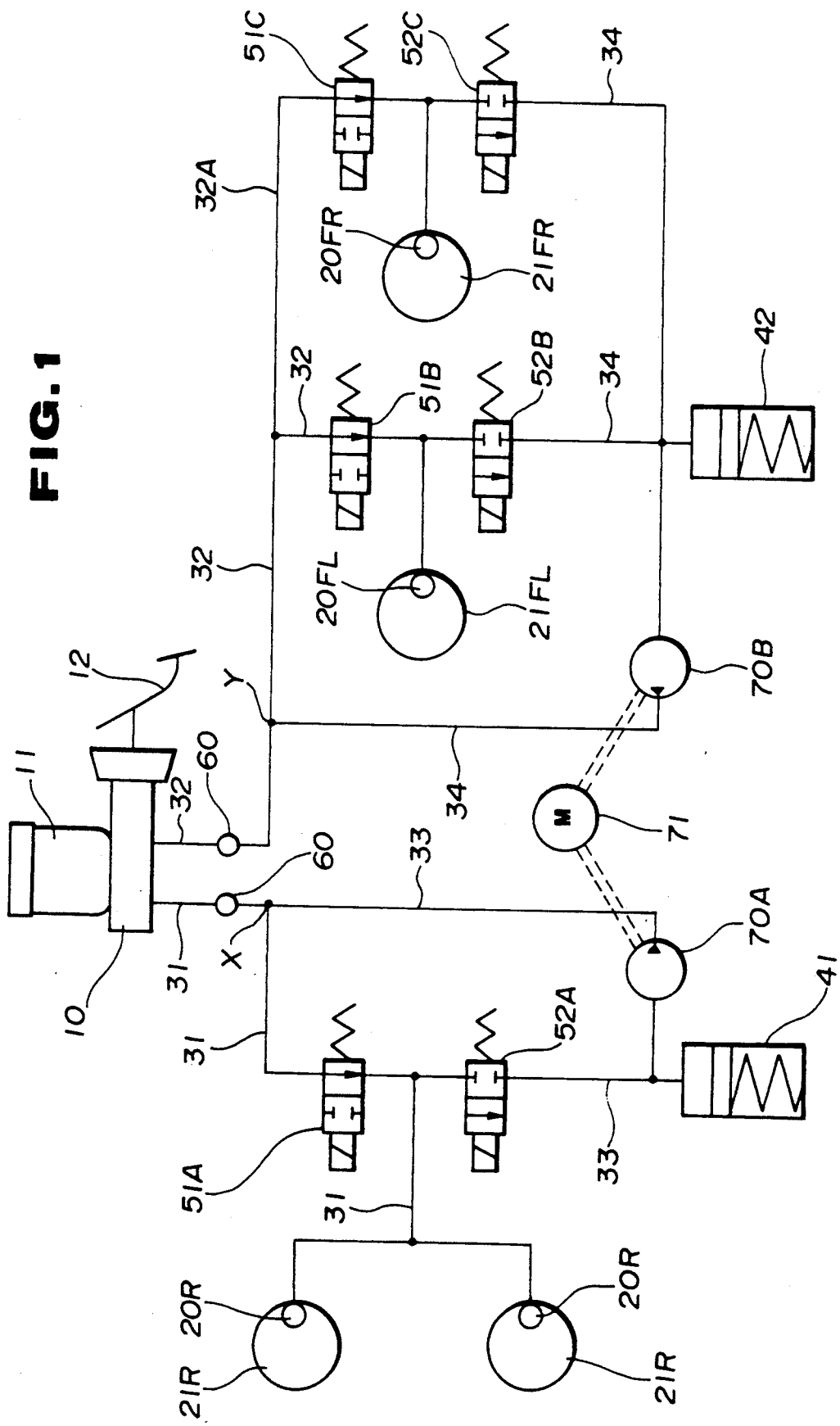
FIG. 1 is a schematic diagram of a first embodiment of a hydraulic brake system according to the present invention.

Referring to FIG. 1, there is shown a hydraulic brake system for an automotive vehicle having two rear wheels 21R and two front wheels, namely a front left wheel 21FL and a front right wheel 21FR. The brake system comprises a master cylinder 10 having a first hydraulic fluid chamber and a second fluid chamber and a fluid reservoir 11. A brake pedal 12 is attached to the master cylinder 10.

The brake system has two wheel cylinders 20TR for the two rear wheels 21R, respectively, and two wheel cylinders 20FL and 20FR for the two front wheels 21FL and 21FR, respectively. Although, not shown, wheel speed sensors are provided to detect wheel revolution speeds of all of the wheels, respectively.

The first hydraulic chamber of the master cylinder 10 is connected to rear wheel cylinders 10R through a first passageway 31. The second hydraulic chamber of the master cylinder 10 is connected to a front wheel wheel cylinder 20FL through a second passageway 32, and also to a front right wheel cylinder 20FR through a branch passageway 32A of the second passageway 32.

A first return passageway 33 is connected to the first passageway 31. Connected to the first return passageway 33 is a first reservoir 41. The first return passageway has a downstream end connected to the first passageway 31 at a junction X. A second return passageway 34 is connected to the second passageway 32 and its branch passageway 32A. Connected to the second return passageway 34 is a second reservoir 42. The second return passageway 34 has a downstream end connected to the second passageway 32 at a junction Y.

Fluidly disposed in the first passageway 31 between the unction X and the rear wheel cylinders 20R is a first electromagnetic inflow valve 51A. Fluidly disposed in the second passageway 32 between the junction Y and the front left wheel cylinder 20FL is a second electromagnetic inflow valve 51B. Fluidly disposed in the branch passageway 32A between the junction Y and the front right wheel cylinder 20FR is a third electromagnetic inflow valve 51C.

Fluidly disposed in the first return passageway 33 between the rear wheel cylinders 20R and the first reservoir 41 is a first electromagnetic outflow valve 52A. Fluidly disposed in the second return passageway 34 between the front left wheel cylinder 20FL and the second reservoir 42 is a second electromagnetic outflow valve 52B. Fluidly disposed in the second return passageway 34 between the front right wheel cylinder 20FR and the second reservoir 42 is a third electromagnetic outflow valve 52C.

Each of the first, second and third electromagnetic inflow control valves 51A, 51B and 51C is a normally open two-position valve which has an open position and a closed position. Each of the electromagnetic outflow control valves 52A, 52B and 52C is a normally closed two-position valve having a closed position and an open position. These electromagnetic valves are controlled by the controller.

Fluidly connected to the first return passageway 33 is a first pump 70A and fluidly connected to the second return passageway 34 is a second pump 70B. These pumps 70A and 70B are driven by a motor 71 which is controlled by the controller.

The controller is a microcomputer based control unit which performs arithmetic operations in accordance with control programs to process data derived from various information given by sensors including the wheel revolution speed sensors to give instruction signals on which the electromagnetic valves 51A, 51B, 51C, 52A, 52B and 52C and the motor 71 are actuated.

Fluidly disposed in the first passageway 31 between the master cylinder 10 and the junction X is a first plunger valve 60. Fluidly disposed in the second passageway 32 between the master cylinder 10 and the junction Y is a second plunger valve 60. These plunger valves 60 are identical in construction and operation and explained below in connection with FIG. 2.

Figure 2:
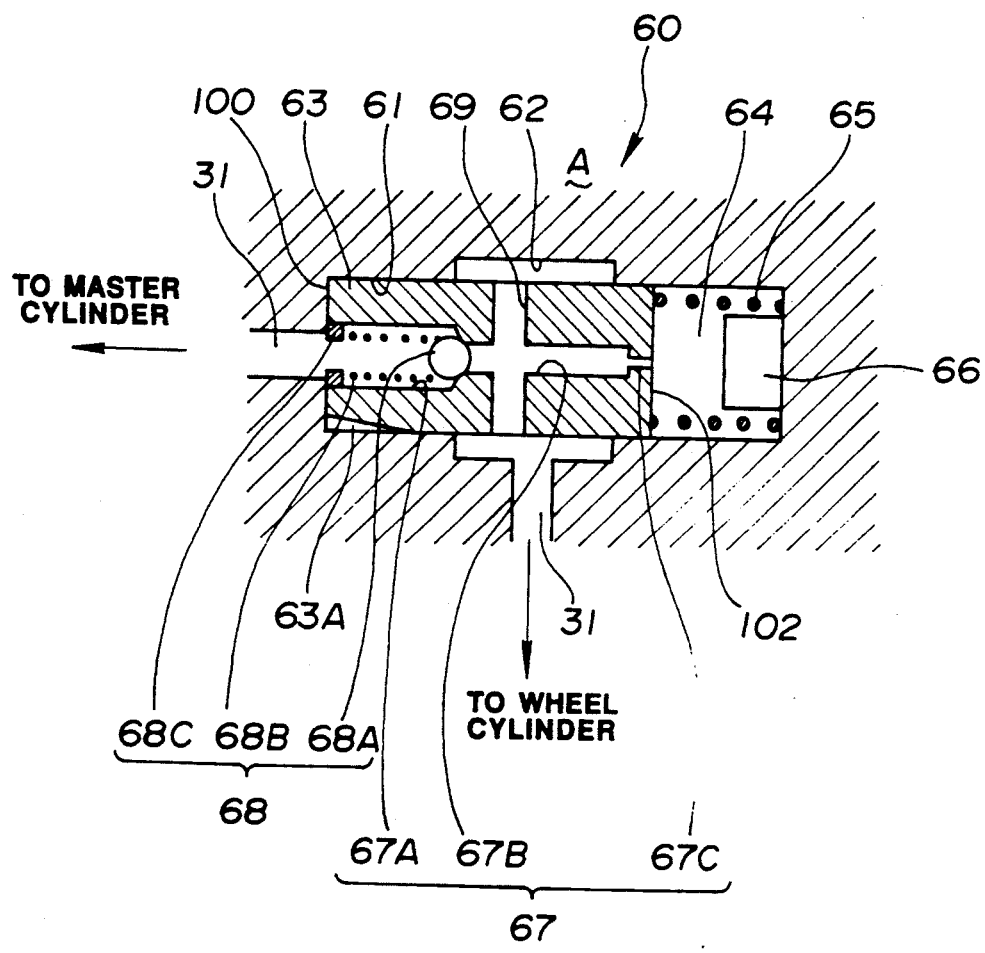
FIG. 2 is a schematic section of a plunger valve used in the brake system.

Referring to FIG. 2, the first plunger valve 60 disposed in the first passageway 31 is explained.

In FIG. 2, the reference character A designates a body formed with a cylindrical valve bore 61. This cylindrical bore 61 has one end open and an opposite and closed. The cylindrical bore 61 defining wall is formed with a circumferential groove 62 which is situated between the one and opposite ends of the bore 61. That portion of the first passageway 31 which extends between the master cylinder 10 and the plunger valve 60 (see FIG. 1) is open at the one end of the cylindrical bore 61. That portion of the first passageway 31 which extends between the plunger valve 60 and the junction X is open at the bottom of the circumferential groove 62. Thus, it will now be understood that the cylindrical bore 61 and the circumferential groove 62 form a part of the first passageway 31.

Slidably disposed in the cylindrical bore 61 is a reciprocal pressure responsive plunger 63. The plunger 63 has one axial end 100 opposed to the open end of the cylindrical bore 61 and an opposite axial end 102 opposed to the closed end of the cylindrical bore 61. The plunger 63 defines in the cylindrical bore 61 a variable volume chamber 64 between the axial end 102 of the plunger 653 and the closed end of the cylindrical bore 61. A plunger spring 65 is disposed in the chamber 64 between the axial end 102 of the plunger 63 and the closed end of the cylindrical bore 61 to bias the plunger 63 to a spring set position as illustrated in FIG. 2 wherein the axial end 100 abuts the open end of the cylindrical bore 61. Projecting into the cylindrical bore 61 from the closed end thereof is a stop 66 which is adapted to abut the axial end 102 of the plunger 63 to limit its further movement toward the closed end of the cylindrical bore 61.

The plunger 63 is formed with a stepped axial cylindrical bore 67 including a central axial bore section 67B having one end connected to an enlarged diameter axial bore section 67A which is open at the axial end 100 of the plunger 63. The control axial bore section 67B has an opposite end connected to a reduced diameter axial bore section, i.e., an orifice passage, 67C which is open at the opposite axial end 102 of the plunger 63. The plunger 63 is formed with a radial bore 69 intersecting and thus communicating with the central axial bore section 67B. The radial bore 69 is open at its both ends and always communicates with the circumferential groove 62 within a range of stroke of the reciprocal plunger 63.

Designated by the reference numeral 68 is a built-in one-way check valve disposed in the enlarged diameter axial bore section 67A. The one-way check valve 68 includes a ball 68A, a spring retainer ring 68C fixed to the plunger 63 and a return spring 68B biasing the ball 68A to a closed position wherein fluid communication between the bore sections 67A and 67B is blocked.

The plunger 63 is formed with a corner cutout 63A extending inwardly from the axial end 100 to define a transfer passage or clearance between the corner cutout 63A and the cylindrical bore 61 defining wall. When the plunger 63 is in the spring set position as illustrated in FIG. 2, the corner cutout 63A is not in overlapping relationship with the circumferential groove 62. The plunger 63 has a first pressure acting area, including the axial end 100, exposed to master cylinder pressure and a second pressure acting area, on the axial end 102, exposed to hydraulic fluid pressure which builds up in the chamber 64. The plunger 63 is movable against the spring 65 by displacing hydraulic fluid out of the chamber 64 via the orifice 67C to a second position wherein the corner portion 63A is in overlapping relationship with the circumferential groove 62.

The operation is explained below.

(1) Usual Braking

In usual running states of an automotive vehicle, all of the electromagnetic inflow valves 51A, 51B and 51C are open and all of the electromagnetic outflow valves 52A, 52B and 52C are closed. The plunger valve 60 takes the spring set position as illustrated in FIG. 2 under the bias of the spring 65.

Under this condition, as the brake pedal is depressed, it moves a piston, not shown, within the master cylinder 10, forcing hydraulic fluid into the plunger valves 60. Hence, it causes the plunger 63 of each of the plunger valves 60 to move against the action of the spring 65. In FIG. 2, as the plunger 63 moves to the right, it displaces a portion of hydraulic fluid out of the chamber 64. The portion of hydraulic fluid flows out of the chamber 64 into the axial bore portion 67B via the orifice 67C. After the plunger 63 has moved through a predetermined axial distance, the corner cutout 63A begins to overlap with the circumferential groove 62. Thereafter, the degree of opening between the clearance defined by the corner cutout 63A and the circumferential groove 62 increases as the plunger 63 moves further, allowing hydraulic fluid forced out of the master cylinder 10 to flow through the corner cutout 63A into the circumferential groove 62, which in turn flows into the associated ones of the wheel cylinders 20R, 20FL and 20FR, causing the wheel cylinder pistons to move. In this manner, full fluid communication between the master cylinder 10 and the wheel cylinders 20R, 20FL and 20FR is delayed. However, this delay is negligible since it ranges from 20 mili seconds to 50 mili seconds.

After hydraulic fluid pressure applied to the wheel cylinders 20RR, 20FL and 20FR has increased to a level as high as that of the master cylinder 10, forces acting on both axial ends of the plunger 632 cause the plunger 63 of each of the plunger valves 60 to move back to the spring set position as illustrated in FIG. 2. If, in this case, the brake pedal 12 is released, hydraulic fluid supplied to the wheel cylinders 20R, 20FL and 20FR returns to the master cylinder 10 via the one-way check valve 68.

(2) Skid Control

In this system, the front left wheel 21FL, front right wheel 21FR and a pair of rear wheels 21R are subject to skid control independently. The manner of skid control is common. Thus, for the sake of brevity, the skid control on the rear wheels 21R only is explained below.

Under braking with the brake pedal 12 depressed, a skid control consisting of a pressure reduction mode, a pressure hold mode and a pressure increase mode is performed in response to output of the controller.

In pressure reduction mode, the electromagnetic inflow valve 51A is closed, the electromagnetic outflow valve 52A is opened, and the motor 71 is actuated to drive the pump 70A, causing hydraulic fluid to flow out of the wheel cylinders 20R back to the master cylinder 10 through the return passageway 33, resulting in reduction in hydraulic fluid pressure applied to the wheel cylinders 20R.

In pressure hold mode, the electromagnetic outflow valve 52A is closed with the electromagnetic inflow valve 51A kept closed.

In pressure increase mode, the electromagnetic inflow valve 51A is opened with the electromagnetic outflow valve 52A kept closed. In this mode which takes place after two preceding hold and reduction modes, the master cylinder pressure becomes higher than it was when the electromagnetic inflow valve 51A was closed, causing the plunger 63 (see FIG. 2) to move against the spring 65, forcing hydraulic fluid out of the chamber 64 into the rear wheel cylinders 20R. The hydraulic fluid passes through the orifice 67C, and thus a rapid change in pressure supplied to the wheel cylinders 20R is suppressed preventing a pressure surge from occurring.

Figure 3:
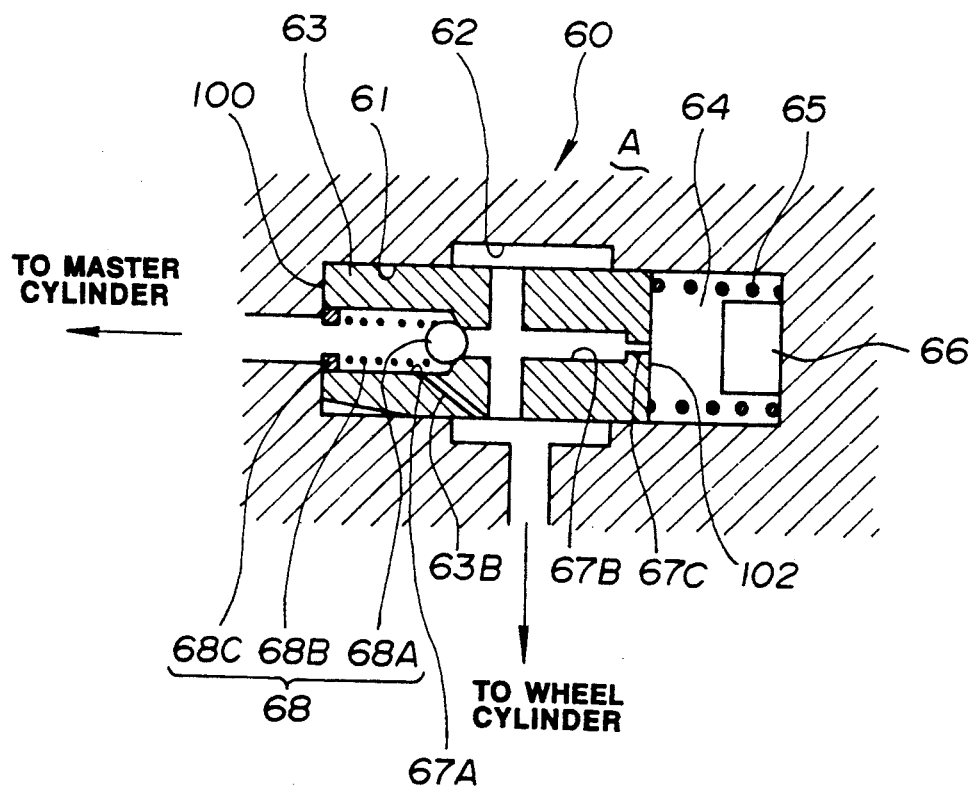
FIG. 3 is a similar view to FIG. 2 illustrating a modified plunger valve and for explaining a second embodiment according to the present invention.

Referring to FIG. 3, a second embodiment is explained.

This second embodiment is substantially the same as the first embodiment except the addition of a bypass passage 63B bypassing a ball 68A of a one-way check valve 68 of each of the plunger valves 60. The bypass passage 63B is drilled through a plunger 63 and has one end communicating with an enlarged diameter bore section 67A accommodating a return spring 68B of the check valve 68 and an opposite end always communicating with a circumferential groove 62. Owing to the provision of the bypass passage 63B, hydraulic fluid can flow through the bypass passage 63B after the ball 68A has blocked fluid communication between the bore sections 67B and 67A, thus eliminating residual pressure at the wheel cylinder.

Figure 4:
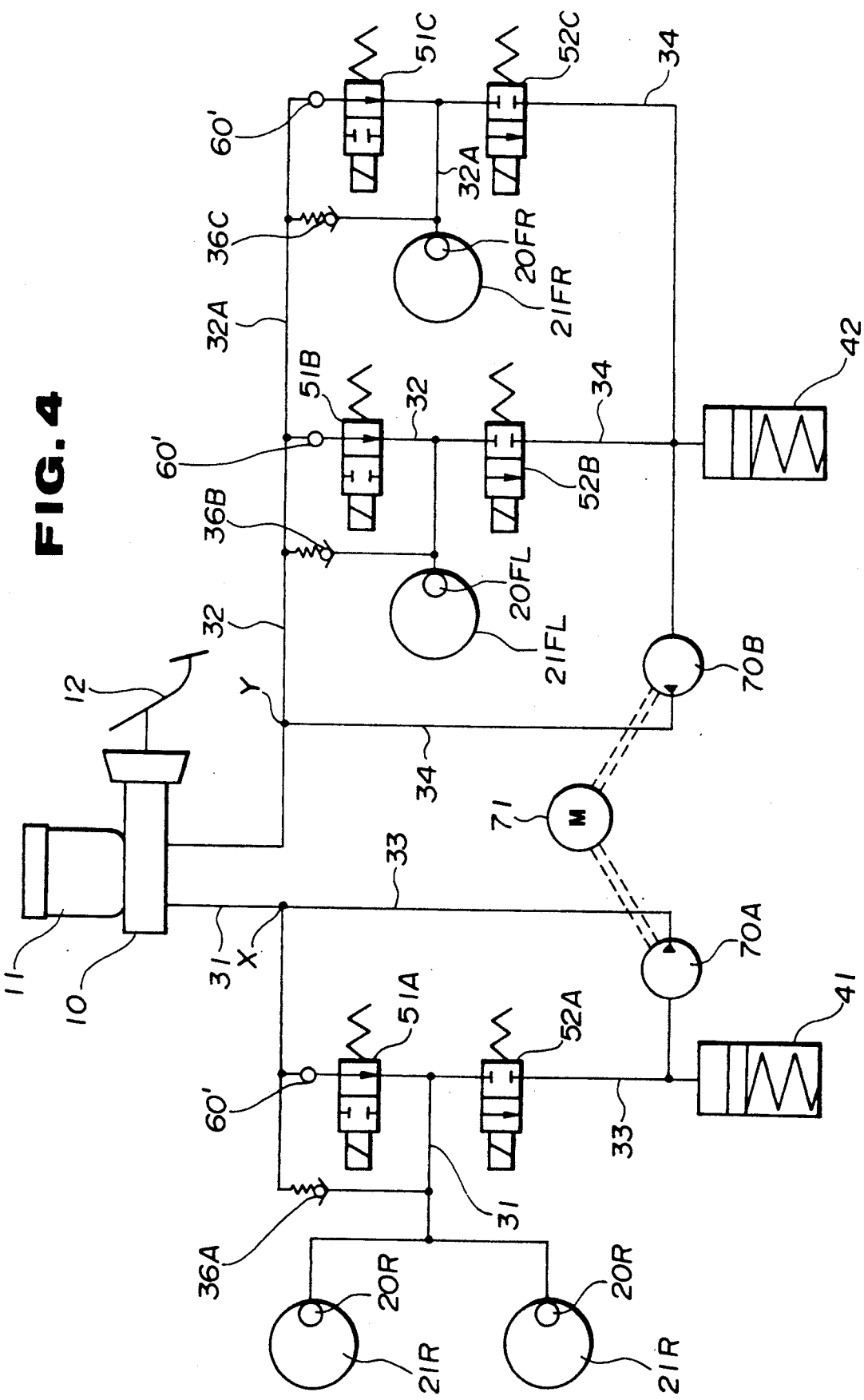
FIG. 4 is a similar view to FIG. 1 illustrating a third embodiment according to the present invention.
Figure 5:
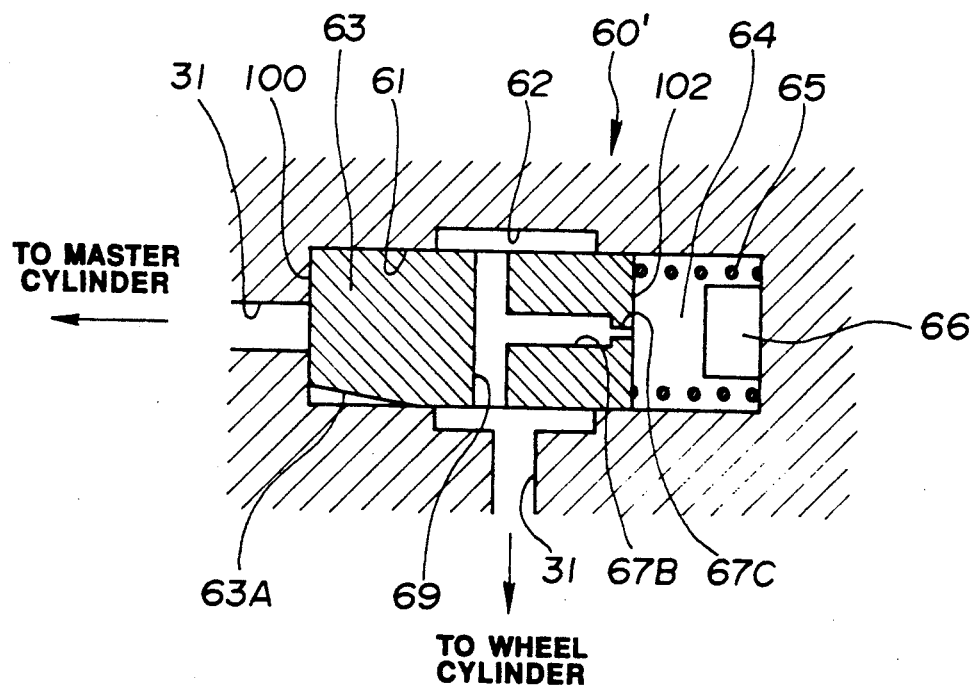
FIG. 5 is a schematic section of a plunger valve used in the brake system shown in FIG. 4.

Referring to FIGS. 4 and 5, a third embodiment is explained.

This third embodiment is substantially the same as the first embodiment, but it is different from the same mainly in that a plunger valve 60' as shown in FIG. 5 which is not provided with a built-in one-way check valve is used instead of the plunger 60 of the built-in one-way check valve type. As shown in FIG. 4, three of such plunger valves 60' are used. Specifically, a first one of the plunger valves 60' is fluidly disposed in a passageway 31 between a first electromagnetic inflow valve 51A and a junction X with a return passageway 33, and a first one-way check valve 36A is connected to the passageway 31 in parallel to the first plunger valve 60' and the first electromagnetic inflow valve 51A. A second plunger valve 60' is fluidly disposed in a passageway 32 between a second electromagnetic inflow valve 51B and a junction Y with a return passageway 34, and a second one-way check valve 36B is connected to the passageway 32 in parallel to the second plunger valve 60' and the second electromagnetic inflow valve 51B. A third plunger valve 60' is fluidly disposed in a branch passageway 32A between a third electromagnetic inflow valve 51C and the junction Y and a third one-way check valve 36C is connected to this branch passageway 32A in parallel to the third plunger valve 60' and the third electromagnetic inflow valve 51C.

According to this third embodiment, since the one-way check valve is not built-in, a reduction in size of the plunger valve has been accomplished. This reduction in size allows arrangement of the plunger valves in the same sense as in arranging fixed orifices in the system.

What is claimed is:

1. A hydraulic brake system comprising:
   a master cylinder with a brake pedal;
   a wheel cylinder; and
   a valve fluidly disposed between said master cylinder and said wheel cylinder,
   said valve including a valve bore having a first end wall opening and communicating with said master cylinder and a second end wall closed,
   said valve including a plunger slidably disposed in said valve bore and having a first end face opposed to said first end wall of aid valve bore and a second end face opposed to said second end wall of said valve to define therebetween a chamber within said valve bore,
   said valve including peripheral wall means interconnecting said first and second end walls to define said valve bore, said wall means being formed with a groove communicable with said wheel cylinder,
   said valve including means for permitting restricted fluid flow communication between said chamber and said groove,
   said valve including a spring biasing said plunger to a first position wherein said plunger covers said groove,
   said plunger having a first pressure acting bore on said first axial end face, which is subject to a first hydraulic fluid pressure from said master cylinder, and a second pressure acting area, on said second axial end face, which is subject to a second hydraulic fluid pressure within said chamber,
   said plunger being movable from said first position against said spring in response to a deference between said first pressure and said second pressure and to a second position wherein said plunger uncovers said groove to open fluid flow communication of said groove with said master cylinder.

2. A hydraulic brake system as claimed in claim 1, wherein during movement of said plunger from said first position toward said second position, said plunger displaces a portion of hydraulic fluid out of said chamber to said groove through said restricted fluid flow communication permitting means.

3. A hydraulic brake system as claimed in claim 2, wherein said plunger is formed with a corner cutout extending from said first end face thereof toward said groove.

4. A hydraulic brake system as claimed in claim 3, wherein said corner cutout overlaps with said groove when said plunger assumes said second position thereof.

5. A hydraulic brake system as claimed in claim 4, wherein said restricted fluid flow communication permitting means include a first bore extending into said plunger and having an orifice and a second bore extending into said plunger, said first bore having one end opening to said chamber and an opposite end, said second bore, opening to said groove and communicating with said first bore.

6. A hydraulic brake system as claimed in claim 5, wherein said opposite end of said first bore is closed.

7. A hydraulic brake system as claimed in claim 6, further comprising:
   a normally open valve fluidly disposed between said groove and said wheel cylinder; and
   one-way passage means fluidly disposed between said wheel cylinder and said master cylinder for allowing return flow of hydraulic fluid from said wheel cylinder back to said master cylinder.

8. A hydraulic brake system as claimed in claim 5, wherein said opposite end of said first bore is open to communicate with said master cylinder, and said plunger has a one-way check valve so constructed and arranged as to close said opposite end of said first bore.

9. A hydraulic brake system as claimed in claim 8, wherein said plunger is formed with passage means for establishing fluid flow communication between said groove and said master cylinder bypassing said one-way check valve.

10. A hydraulic brake system as claimed in claim 9, further comprising:
    a normally open valve fluidly disposed between said groove and said wheel cylinder.

11. A hydraulic brake system as claimed in claim 8, further comprising:
    a normally open valve fluidly disposed between said groove and said wheel cylinder.

* * * * *